US009769547B2

(12) United States Patent
Niedzwiecki et al.

(10) Patent No.: US 9,769,547 B2
(45) Date of Patent: Sep. 19, 2017

(54) METHOD FOR SIMULTANEOUS DETECTION OF A PLURALITY OF RFID TAGS USING MULTIUSER DETECTION

(75) Inventors: Joshua D. Niedzwiecki, Manchester, NH (US); Prabahan Basu, Lexington, MA (US)

(73) Assignee: COLLISION COMMUNICATIONS, INC., Peterborough, NH (US)

( * ) Notice: Subject to any disclaimer, the term of this patent is extended or adjusted under 35 U.S.C. 154(b) by 2509 days.

(21) Appl. No.: 12/539,691

(22) Filed: Aug. 12, 2009

(65) Prior Publication Data

US 2010/0039233 A1    Feb. 18, 2010

Related U.S. Application Data

(60) Provisional application No. 61/188,738, filed on Aug. 12, 2008.

(51) Int. Cl.
*H04Q 9/00* (2006.01)
(52) U.S. Cl.
CPC ........... *H04Q 9/00* (2013.01); *H04Q 2209/47* (2013.01); *H04Q 2209/753* (2013.01)
(58) Field of Classification Search
USPC ....................................... 340/10.1
See application file for complete search history.

(56) References Cited

U.S. PATENT DOCUMENTS

| 6,704,376 B2 | 3/2004 | Mills et al. |
| 6,831,574 B1 | 12/2004 | Mills et al. |
| 6,839,390 B2 | 1/2005 | Mills |
| 6,859,801 B1 * | 2/2005 | Law ...................... G01S 13/751 |

(Continued)

FOREIGN PATENT DOCUMENTS

| JP | 2000-252918 A | 9/2000 |
| WO | 2000-71843 A2 | 11/2000 |

OTHER PUBLICATIONS

JP Office Action dated Nov. 29, 2011 against JP Patent Application No. 2009-098246; translation by Meisei International Patent Firm.
(Continued)

*Primary Examiner* — Joseph Feild
*Assistant Examiner* — John Mortell (57) ABSTRACT

A method and apparatus are disclosed that apply multiuser detection (MUD) analysis to an aggregated RF response from a plurality of simultaneously queried RFID tags, so as to distinguish the individual tag responses. The claimed method thereby significantly reduces RFID detection latency when multiple tags are simultaneously queried. Some embodiments transmit carrier waves at more than one frequency, such as a plurality of equally-spaced frequencies, so as to enhance the MUD analysis by incorporating a multi-frequency dimension. Other embodiments incorporate additional spatial dimensions by deploying multiple RF detection antennae at separated locations. The number of colliding tag responses must be estimated before MUD analysis can be applied. In some embodiments other signal parameters must be estimated, such as signal bias and an impulse function for each responding tag that characterizes alterations of the RF signal while in transit due to propagation distance, passage through intervening objects, and reflections.

22 Claims, 8 Drawing Sheets

(56) References Cited

U.S. PATENT DOCUMENTS

| | | | |
|---|---|---|---|
| 6,947,506 B2 | 9/2005 | Mills | |
| 6,967,598 B2 | 11/2005 | Mills | |
| 6,981,203 B2 | 12/2005 | Mills | |
| 6,999,498 B2 | 2/2006 | Mills et al. | |
| 7,023,817 B2 * | 4/2006 | Kuffner | G06K 7/0008 340/2.2 |
| 7,061,221 B2 | 6/2006 | Niedzwiecki | |
| 7,218,690 B2 | 5/2007 | Learned | |
| 7,245,673 B2 | 7/2007 | MacLeod | |
| 7,903,029 B2 * | 3/2011 | Dupray | G01S 5/0257 342/442 |
| 8,406,251 B2 * | 3/2013 | Kent | H04B 1/7085 370/328 |
| 2002/0070845 A1 | 6/2002 | Reisinger et al. | |
| 2004/0210411 A1 * | 10/2004 | Koo | G01D 3/032 702/104 |
| 2006/0215611 A1 | 9/2006 | Nakagawa et al. | |
| 2011/0051674 A1 | 3/2011 | Niedzwiecki et al. | |

OTHER PUBLICATIONS

EP Office Action dated Jan. 18, 2011 against (related) EP Patent Application No. 038176798; BAE Systems Information and Electronic Systems Integrations, Inc. (Applicant).

Baines, S.J. et al., "Double window multi-user detection for asynchronous DS-CDMA", IEEE 1996, Electronic Letters, Nov. 21, 1996, vol. 32, No. 24, pp. 2199-2201.

Damnjanovic, A. et al., "Iterative Multiuser Detection/Decoding for Turbo Coded CDMA Systems", IEEE Communications Letters, vol. 5, No. 3, Mar. 2001, pp. 104-106.

Wang, X. et al., "An Overlapping Window Decorrelating Multiuser Detector for DS-CDMA Radio Channels", IEEE Transactions on Communications, vol. 49, No. 8, Aug. 2001, pp. 1488-1495.

Sklar, Bernard; Digital Communications Fundamentals and Applications, Second Edition, 2001 Prentice-Hall Inc., Upper Saddle River, New Jersey, p. 176.

Sklar, Bernard; Digital Communications Fundamentals and Applications, Second Edition, 2001 Prentice-Hall Inc., Upper Saddle River, New Jersey, pp. 678-686.

Meyr, H., Moeneclaey, M., Fechtel, S.; Digital Communication Receivers, John Wiley & Sons, Inc., New York NY, 1998, pp. 311-316.

Verdu, Sergio; Multiuser Detection, Cambridge University Press, NY, USA 1998, pp. 109-115.

Hayt Jr, W., Buck, J.; Engineering Electromagnetics, McGraw-Hill International Edition, 2006, p. 396.

International Organization for Standardization, Information Technology, Radio Frequency Identification for Item Management—Part 6: parameters for air interface communications at 860 MHz, 1st edition, 200.

U.S. Non-Final Office Action mailed Jan. 17, 2013 for related U.S. Appl. No. 13/090,435, filed Apr. 20, 2011, references cited herein.

* cited by examiner

METHOD FOR SIMULTANEOUS DETECTION OF A PLURALITY OF RFID TAGS USING MULTIUSER DETECTION

RELATED APPLICATIONS

This application claims the benefit of U.S. Provisional Applications No. 61/188,738, filed Aug. 12, 2008, which is herein incorporated by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to electronic identification systems, and more particularly to RFID tag reading systems.

BACKGROUND OF THE INVENTION

RFID tags are identification tags that can be detected and "read" by radio frequency communication. The use of this technology is growing very rapidly, and is being, or is expected to be, applied in a wide variety of applications, ranging from warehouse inventory control, shipping and receiving, shipment tracking, retail sales (e.g. supermarket check-out), building security (e.g. employee ID tags), and military asset tracking. In many of these applications, RFID tags have already, or will soon, replace barcodes as the primary method of automatic item detection and identification.

Typically, RFID technology comprises an RFID detector, which is able to transmit RF signals and detect RF responses, and at least one RFID tag, which is able to receive the RF signals from the RFID detector and respond to them. The RFID tags can be active, in that they are powered by an included battery, passive, in that they are powered by the energy of the detector's RF signal, or "mixed." An example of a mixed RFID tag would be a tag that includes a capacitor or other short term power source that is normally discharged, but is temporarily charged by the energy of an RF query signal from the detector, after which it supplies energy to the tag for a short time while the tag responds to the RF query.

Figure 1A:
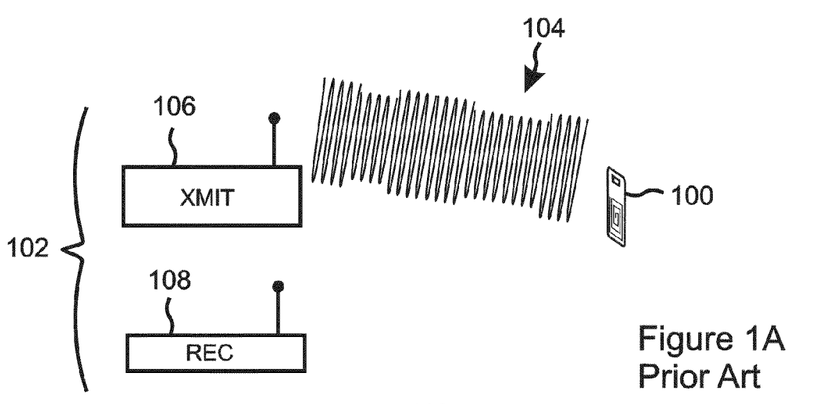
FIG. 1A is a functional diagram illustrating an RFID detector transmitting a query signal to an RFID tag in a typical prior art configuration.

With reference to FIG. 1A, detection of an RFID tag 100 begins with transmission by an RF transmitter 106 included in the RFID detector 102 of a query signal 104. Typically, the query signal 104 is an RF wave that is amplitude modulated, for example according to amplitude shift keying (ASK). See for example B. Sklar, *Digital Commuincations*, Prentice Hall, 2nd edition, 2001, incorporated herein by reference.

Figure 1B:
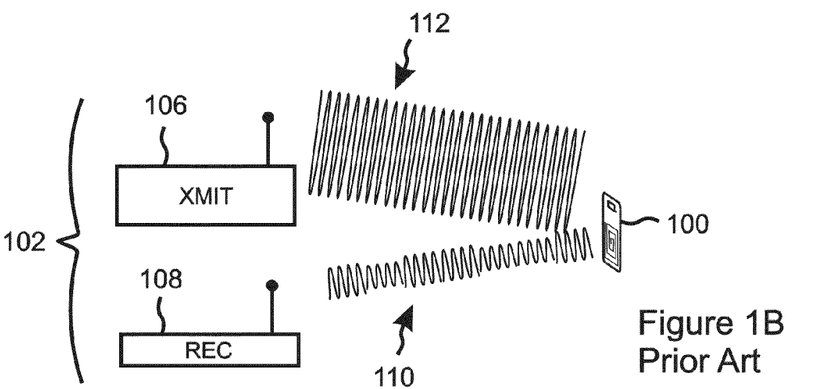
FIG. 1B is a functional diagram illustrating an RFID detector transmitting a carrier wave to a passive RFID tag, while the RFID tag simultaneously transmits a response signal to the RFID detector in a typical prior art configuration.

As shown in FIG. 1B, the RFID tag 100 detects the query signal 104, and responds with the requested information 110, typically including an ID number, a date, an employee ID number, or whatever information is appropriate under the circumstances. In the case of a passive RFID tag, the detector 102 continues to broadcast an unmodulated carrier RF wave 112 while it simultaneously detects the response 110 of the RFID tag 100. The carrier wave 112 serves as the power source for the RFID tag 100 while the RFID tag 100 is replying. In such cases, the passive RFID tag 100 typically modulates the carrier wave 112 by passing the carrier wave 112 through a variable impedance, and then re-transmitting the modulated RF wave 110 back to the RF receiver 108 included in the RFID detector 102.

One of the principle advantages of RFID technology, as compared for example to barcode technology, is that RFID technology does not require that the detector be directed specifically to the tag being read. While an RFID detector 102 can be somewhat directional, and its detection range can be adjusted from a few feet to a few yards, it is not necessary that the detector 102 be focused specifically on an individual RFID tag 100. In fact, the RFID tag 100 need not be visible, so long as it is within the detection range of the RFID detector 102 and is accessible to radio waves.

Figure 1C:
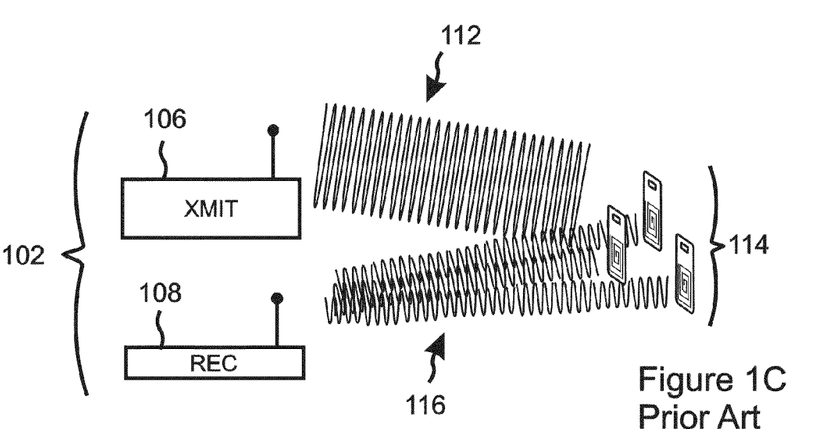
FIG. 1C is a functional diagram illustrating an RFID detector transmitting a carrier wave to a plurality of RFID tags while the RFID tags simultaneously transmit response signals to the RFID detector.

With reference to FIG. 1C, while the non-directional nature of RFID technology can significantly facilitate the speed with which items are detected, for example as grocery items pass by a cash register in a supermarket, this non-directionality also presents significant challenges when more than one RFID tag 114 falls within range of the detector 102 at the same time. For example, it may be desired to detect a large number of tags attached to individual items carried by a pallet that is about to be shipped. In such a case, all of the tags 114 will respond simultaneously to an RFID query 104, and it will be nearly impossible for the detector 102 to extract any meaningful information from the resulting aggregated mixture 116 of signals that is detected by the receiver 108.

So as to address this dilemma, media access control (MAC) protocols such as ALOHA or slotted ALOHA (see B. Sklar, op. cit.) are sometimes used to minimize response collisions by requiring RFID tags to transmit and retransmit their responses at random times until a collision-free response has been received from each tag. A simplified example is presented in FIG. 2. In this example, instructions are included in the query 104 that cause each of the RFID tags 114 to select a random timeslot 200 from 1 to 5 in which to transmit its response, and to continue this process until it receives an acknowledgement that its signal has been read. For convenience, the behavior of 8 tags 202 is indicated in the figure. In the first group of five timeslots 204 tags 4, 6, and 7, by chance, respond in unique timeslots and are successfully detected. Hence, they do not re-transmit during the second group 206 of five timeslots. However, tags 1 and 3 collide during the first timeslot, and tags 2, 5, and 8 collide during the third timeslot. These five tags therefore repeat their responses in randomly chosen timeslots 200 during the second group 206 of five timeslots.

Figure 2:
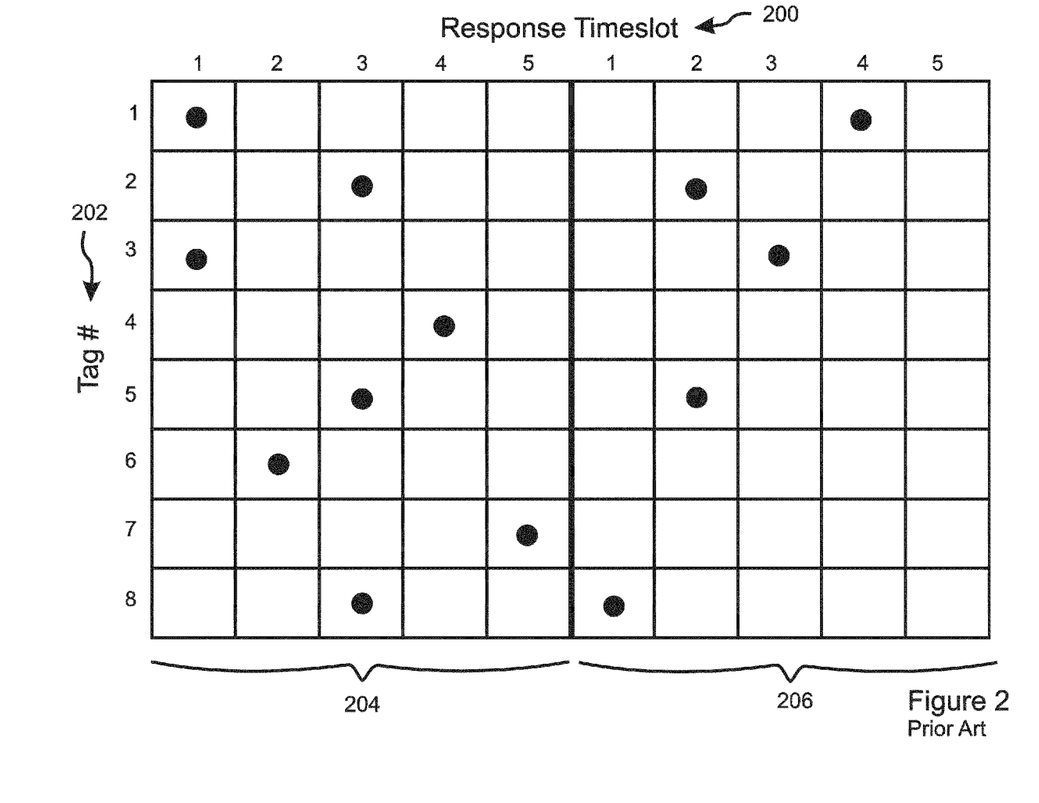
FIG. 2 is a table illustrating a simplified ALOHA protocol of the prior art for distinguishing the responses of a plurality of simultaneously queried RFID tags.

In the second group 206 of five timeslots, tags 1, 3, and 8 are received in unique timeslots and are successfully detected. However, tags 2 and 5 collide in the second timeslot, and will need to be repeated again in the third timeslot group (not shown) of five timeslots. It is apparent from this example that while protocols such as ALOHA or slotted ALOHA can provide a solution for detecting a plurality of simultaneously queried RFID tags, these protocols are extremely inefficient due to the large latency that they add to the detection process. It is conceivable that a pallet of goods in a warehouse may contain hundreds, or even thousands of individual products, each with its own RFID tag. In such a case, using current RFID tag technology, it could take several minutes for an RFID reader to query and receive each tag's information.

What is needed, therefore, is a technique for rapidly and accurately distinguishing the responses of a plurality of RFID tags when all of the RFID tags are simultaneously queried by an RFID detector.

SUMMARY OF THE INVENTION

A method is claimed that applies multiuser detection (MUD) analysis to an aggregated RF response received from a plurality of simultaneously queried RFID tags, so as to accurately distinguish each of the individual responses included in the aggregated RF response. If the aggregated RF response includes responses from only a subset of the simultaneously queried RFID tags, for example due to use of a MAC protocol, the steps of receiving an aggregated RF response and applying MUD analysis are repeated until the responses of all of the queried RFID tags have been distinguished. By enabling an RFID detector to simultaneously distinguish the responses of several RFID tags, the claimed method significantly reduces RFID detection latency in cases when multiple RFID tags are simultaneously queried.

Fundamentally, Multi-User Detection ("MUD") analysis capitalizes on differences in analog signal characteristics that apply to the plurality of signals received from the RFID tags, and exploits these analog differences, such as amplitude and phase, so as to differentiate the tag signals from each other. For example, differences in the relative distances and orientations of the RFID tags, as well as the number, types, and locations of intervening objects, will cause signals from otherwise identical RFID tags to arrive at the RFID detector at slightly different times and with differing amplitudes and phases. There may even be more complicated time-dependent behavior that differentiates the RFID tags, for example if some of the signals are reflected from various objects. In general, these various analog signal characteristics can be thought of as analytical "dimensions" into which the signals from the different RFID tags are separated and thereby distinguished from each other. The details of various multiuser detection ("MUD") analysis methods are presented in references cited below and are incorporated herein by reference.

Some embodiments of the present invention enhance the MUD analysis by expanding on the number of "dimensions" that can be used to differentiate the signals from the RFID tags. Some of these embodiments incorporate a multi-frequency dimension by simultaneously transmitting carrier waves at more than one frequency, for example at a plurality of equally-spaced frequencies. Other embodiments incorporate additional spatial dimensions by deploying multiple RF detection antennae at separated locations.

It is necessary to estimate at least one signal parameter for each of the responding RFID tags before MUD analysis can be applied. These signal parameters can include signal bias, number of collisions (i.e. number of tags simultaneously transmitting), and an impulse function for each responding tag that characterizes how the responding RF signal from the tag is altered in phase and amplitude (and possibly also in time behavior) due to propagation over the intervening distance, including propagation through any intervening objects and reflection from any RF reflective items that may be present.

Signal bias can be estimated by assuming a zero net bias and measuring an average bias over time.

The number of collisions can be estimated by applying a statistical analysis clustering technique, such as a K-Means algorithm, a maximum likelihood solution, or a T test, so as to detect clustering of the detected RF signals in complex (i.e. phase and amplitude) space.

Once the bias and number of simultaneously transmitting tags have been determined, the impulse response functions can be estimated for each of the RFID tags contributing to the aggregated RF signal.

One general aspect of the present invention is a method for distinguishing responses received by an RFID detector from a plurality of simultaneously queried RFID tags. The method includes the following steps:

querying the plurality of RFID tags;

receiving an aggregated RF response from the plurality of RFID tags;

characterizing the aggregated RF response according to a plurality of characteristics, the plurality of characteristics including at least RF amplitude and RF phase;

according to the characterization of the aggregated RF response, estimating at least one parameter, including a number of RFID tag responses included in the aggregated RF response; and applying multiuser detection to the aggregated RF response according to the at least one estimated parameter so as to distinguish each of the RFID tag responses included in the aggregated RF response.

In various embodiments the method further includes repeating the steps of querying, receiving, characterizing, estimating, and applying until the responses of all of the plurality of simultaneously queried RFID tags have been distinguished.

In some embodiments, the at least one parameter includes a signal bias. In some of these embodiments the signal bias is estimated by averaging a bias of the aggregated RF response over a plurality of symbol intervals. And in some of these embodiments, the estimated signal bias is subtracted from the aggregated RF response preceding further analysis of the aggregated RF response.

In various embodiments, estimating the number of RFID tag responses included in the aggregated RF response includes applying a statistical analysis method so as to detect clustering of the aggregated RF response, as characterized according to the plurality of characteristics. And in some of these embodiments the statistical analysis method includes a K-Means algorithm, a Maximum likelihood solution, or a T test.

In certain embodiments the aggregated RF response includes a plurality of unique identifying sequences transmitted simultaneously by each of the responding RFID tags, the identifying sequences being statically independent of each other, and estimating the number of RFID tag responses included in the aggregated RF response includes counting a number of unique eigenvalues in a covariance matrix derived from a portion of the aggregate RF signal that includes the simultaneously transmitted identifying sequences.

In some embodiments, for each of the RFID tags that contributed to the aggregated RF response, the at least one parameter includes a corresponding channel impulse response function that characterizes an alteration of an RF response from the corresponding RFID tag during transit of the RF response from the RFID tag to the RFID detector.

In various embodiments, receiving the aggregated RF response from the plurality of RFID tags includes simultaneously transmitting to the plurality of RFID tags a plurality of RF carrier waves at a plurality of RF frequencies, and characterizing the aggregated RF response according to a plurality of characteristics includes characterizing the aggregated RF response according to frequency. And in some of these embodiments the plurality of RF carrier waves is a plurality of equal amplitude RF carrier waves, and the plurality of RF frequencies is a plurality of equally spaced RF frequencies.

In certain embodiments, receiving the aggregated RF response from the plurality of RFID tags includes obtaining a plurality of spatially separated responses received using a plurality of spatially separated RF receiving antennae, and characterizing the aggregated RF response according to a plurality of characteristics includes characterizing the aggregated RF response according to the plurality of spatially separated responses.

Another general aspect of the present invention is an apparatus for distinguishing responses received from a plurality of simultaneously queried RFID tags. The apparatus includes an RF transmitter that is able to transmit a querying RF signal to the plurality of RFID tags, an RF receiver that is able to receive an aggregated RF response from the plurality of RFID tags, an RF characterizer that is able to characterize the aggregated RF response according to a plurality of characteristics, the plurality of characteristics including at least RF amplitude and RF phase, and a computer controlled by software that is able to direct the computer to estimate at least one parameter pertaining to the characterized aggregated RF response, the at least one parameter including a number of RFID tag responses included in the aggregated RF response, the software being further able to direct the computer to apply multiuser detection to the aggregated RF response according to the at least one estimated parameter, so as to distinguish each of the RFID tag responses included in the aggregated RF response.

In various embodiments, the at least one parameter includes a signal bias. In some of these embodiments the signal bias is estimated by averaging a bias of the aggregated RF response over a plurality of symbol intervals. And in some of these embodiments the estimated signal bias is subtracted from the aggregated RF response preceding further analysis of the aggregated RF response.

In certain embodiments, estimating the number of RFID tag responses included in the aggregated RF response includes applying a statistical analysis method so as to detect clustering of the aggregated RF, as characterized according to the plurality of characteristics. And in some of these embodiments the statistical analysis method includes a K-Means algorithm, a Maximum likelihood solution, or a T test.

In some embodiments the aggregated RF response includes a plurality of unique identifying sequences transmitted simultaneously by each of the responding RFID tags, the identifying sequences being statically independent of each other, and estimating the number of RFID tag responses included in the aggregated RF response includes counting a number of unique eigenvalues in a covariance matrix derived from a portion of the aggregate RF signal that includes the simultaneously transmitted identifying sequences.

In other embodiments, for each of the RFID tags that contributed to the aggregated RF response, the at least one parameter includes a corresponding channel impulse response function that characterizes an alteration of an RF response from the corresponding RFID tag during transit of the RF response from the RFID tag to the RFID detector.

In certain embodiments the RF transmitter is able to simultaneously transmit to the plurality of RFID tags a plurality of RF carrier waves at a plurality of RF frequencies, and the software is able to direct the computer to characterize the aggregated RF response according to the plurality of RF frequencies.

And various embodiments also include a plurality of spatially separated RF receiving antennae that are able to receive the aggregated RF response as a plurality of spatially separated responses, the software being able to direct the computer to characterize the aggregated RF response according to the plurality of spatially separated responses.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Based on current RFID designs, a problem occurs when a plurality of RFID tags is simultaneously queried by an RFID detector, for example a plurality of RFID tags that are attached to each product carried by a shipping pallet. In such a case the detector will receive a nearly simultaneous response from every tag that is located within its detection range, resulting in collisions of the data packets transmitted by the tags. Prior art approaches have implemented protocols that cause packets to transmit their information at random times, and to re-transmit until a collision-free transmission is achieved. The present invention applies Multi-User Detection ("MUD") to distinguish overlapping packets, thereby reducing or eliminating the need for random delays and/or re-transmissions.

Signal Model

Figure 3:
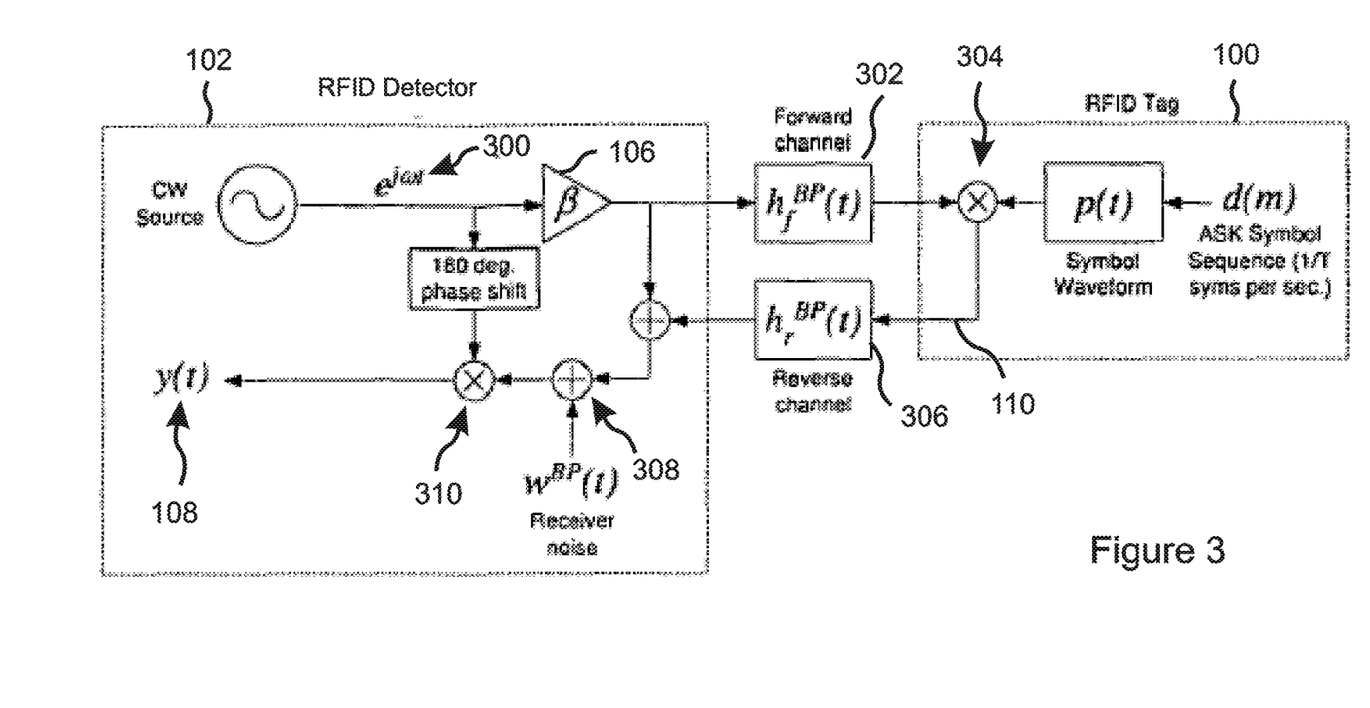
FIG. 3 is a block diagram illustrating a mathematical model describing communication between an RFID detector and a single RFID tag.

So as to understand how the present invention solves this problem, it is helpful first to understand the physics and define a representative signal model that incorporates collisions from multiple tag responses. To start we define the signal model for a single tag scenario and then we extend it to the case where multiple tag responses collide. FIG. 1A and FIG. 1B illustrate the basic query and response for a single RFID tag. This interaction can be mathematically modeled as shown in FIG. 3. An RF carrier wave 300 $e^{j\omega t}$ is generated by the RFID detector 102 and is then amplified in the RF transmitter 106 by a factor $\beta$ so as to be strong enough to transmit a signal to the RFID tag 100 and, in the case of a passive tag, to power the RFID tag 100.

The RF signal is initially transmitted as a query signal 104 to the RFID tag 100. This "forward" signal is modified in transit according to a forward impulse response function 302 $h_f^{BP}(t)$ due to the distance traveled by the RF query signal 104, and possibly also due to passage through and/or reflection from intervening objects, and such like. After transmission of the RF query 104, the RFID detector 102 continues to transmit an unmodulated carrier wave 112.

As shown in FIG. 3, the RFID tag modulates the carrier wave 112 by passing it through a variable impedance 304. The modulated carrier wave 110 is then re-transmitted to the RFID detector 102. The retransmitted signal is modified in transit according to a response impulse function 306 $h_r^{BP}(t)$, due to the distance traveled and also due to any passage through and/or reflections from intervening objects and such like. Along the way, noise 308 is inevitably added to the signal 110. The signal 110 is then phase detected 310, so as to extract both the phase and amplitude of the modulated RF signal 110. Note that, in general, both the RF amplitude and the RF phase can be set by the RF transmitter 106 and the RFID tag 100 to any of several possible values. This enables the RF transmitter 106 and the RFID tag 100 to encode several binary bits into each modulation. For this reason, the transmissions 104, 110 are said to consist of a series of transmitted "symbols," wherein each symbol represents one or more bits.

This process can be mathematically modeled according to the following equations. The complex baseband received signal y(t) is defined as $$y(t) = \left[\left(\sum_{m=1}^{M} d(m)p(t-mT)[\beta e^{j\omega t} * h_j^{BP}(t)]\right) * h_T^{BP}(t)\right] \quad (1)$$
$$e^{-j\omega t} + [\beta e^{j\omega t} + w^{BP}(t)]e^{-j\omega t}$$

which can be reduced with no loss of generality to $$y(t) = \sum_{m=1}^{M} d(m)h(t-mT) + \beta + w(t) \quad (2)$$

where m denotes the symbol index and M denotes the total number of symbols. In equations 1 and 2, $\omega(t)$ denotes the complex baseband white Gaussian noise process defined as $$\omega(t) = \omega^{BP}(t)e^{-j\omega t} \quad (3)$$

and h(t) denotes the complex baseband composite channel impulse response defined as $$h(t) = p(t) * (\gamma h_r^{BP}(t)e^{-j\omega t}), \quad (4)$$

where $\gamma = (\beta e^{j\omega t} * h_f^{BP}(t))e^{-j\omega t}$ is a complex gain. For the purpose of this discussion we assume the return channel $h_r^{BP}(t)$ is multipath free and is therefore represented as a single tap FIR filter. This allows us to represent the baseband equivalent propagation channel as $(\gamma h_r^{BP}(t)e^{-j\omega t}) = \alpha\delta(t)$, which allows h(t) to be rewritten as $$h(t) = \alpha p(t). \quad (5)$$

This assumption holds when the distance between the RFID detector and the tag is less than a few wavelengths which is the case for many RFID tag applications. Though this description assumes a single tap channel, this model can easily be extended to assume a multipath channel. We also assume the symbols transmitted by the retro-reflective tags are spread with a zero mean spreading sequence $\{s_n\}_{n=1}^{N}$ like a Manchester code. In ASK modulation, this enables accurate estimation and removal of the bias term on the received signal as will be discussed in a later section. This spreading sequence can be modeled as part of the symbol waveform defined in FIG. 3 and allows us to rewrite h(t) as $$h(t) = \alpha \sum_{n=1}^{N} s_n g(t - nT_c) \quad (6)$$

where N is the length of the spreading sequence, $T_c$ is the chip period, and g(t) is the chip waveform. Because the modulation scheme is ASK, the elements of the transmitted symbol sequence d(m) are constrained to the set $\{\pm 1 + \psi\}$ where $\psi$ is an arbitrary but fixed complex offset that is based on the reflection coefficient of the tag when sending binary symbols $b_m \in \{\pm 1\}$. It is assumed that the complex gain due to the reflection coefficient of the tag is already incorporated in the reverse channel model $h_r^{BP}(t)$. From this definition, equation (2) can be rewritten as $$y(t) = \sum_{m=1}^{M} [b_m + \psi]h(t - mT) + \beta + w(t). \quad (7)$$

Substituting (6) into (7) yields $$y(t) = a\sum_{m=1}^{M} \sum_{n=1}^{N} b_m s_n g(t - mT - nT_c) + \quad (8)$$
$$a\psi \sum_{m=1}^{M} \sum_{n=1}^{N} s_n g(t - mT - nT_c) + \beta + w(t)$$

On sampling the complex baseband received signal y(t) at the chip rate $T_c$ during the reception of a single symbol $b_m$ and assuming g(t) is a unit energy Nyquist pulse, (8) can be written as follows with no loss in generality $$y = s\alpha b_m + 1\alpha_o + w \quad (9)$$

where y is the N×1 received signal vector sampled at the output of the chip matched filter, s is the N×1 spreading sequence, 1 is an N×1 all ones vector, $\alpha_o = \alpha\psi + \beta$ and w is the complex Gaussian white noise process with covariance $\sigma^2 I$.

This single tag model can now be easily expanded to the situation where K tag responses collide. Because the time base for every tag is obtained through the RFID detector reference signal, and because the propagation delay is short relative to a symbol duration, all the colliding tag responses are assumed to be symbol and packet synchronous. This allows us to represent the signal model as the sum of K received vectors.

$$r = \sum_{k=1}^{K} s_k \alpha_k b_{m_k} + 1\alpha_{o_k} + w \qquad (10)$$
$$= SAb + \Phi a_o + w$$

where k denotes the user index, S is the N×K spreading matrix whose $k^{th}$ column is $S_k$, $A = \text{diag}\{\alpha_1, \ldots, \alpha_K\}$, $b = [b_{m1} \ldots, b_{mK}]^T$, $\Phi$ is an N×K all ones matrix and $a_o = [\alpha_{o1} \ldots, \alpha_{oK}]^T$.

Conventional Demodulation

RFID tag systems today employ conventional demodulators to estimate the symbols transmitted from a single tag. This is accomplished by first estimating and removing the bias on the received signal defined in (9) as follows $$\tilde{y} = y - E\{y\} \qquad (11)$$
$$= sab_m + 1a_o + w - E\{sab_m\} - E\{1a_o\} - E\{w\}$$
$$= sab_m + 1a_o + w - 0 - 1a_o - 0$$
$$= sab_m + w$$

We note that $E\{s\alpha b_m\} = 0$ because, as described above, the spreading sequence s is assumed to be zero mean. From here the complex amplitude $\alpha$ must be estimated. This can be performed using data-aided or non-data-aided maximum likelihood techniques as described in H. Meyr, M. Moenclaey, and S. Fechtel. *Digital Communication Receivers*. Wiley, New York, N.Y., 1998, herein incorporated by reference.

Once signal parameters have been estimated, a matched filter is used to estimates the bits as follows:

$$\hat{b}_m = \text{sgn}\left\{\frac{1}{\alpha} s^H \tilde{y}\right\} \qquad (12)$$

This approach yields the optimal solution for the reception of a single tag response. However, as soon as there are collisions, as modeled in (10), this solution no longer holds. In fact, in most cases this solution will fail. This failure is due to the large amount of interference from colliding tags caused by a high correlation between the spreading sequences $\{s_k\}_{k=1}^{K}$, as described in S. Verdu. *Multiuser Detection*. Cambridge University Press, 1998, incorporated herein by reference.

Multi-User Detection

The present invention uses multiuser detection ("MUD") analysis to extract and differentiate the transmitted symbols from each of a plurality of colliding packets transmitted simultaneously by a plurality of RFID tags. The details of various multiuser detection analysis methods are presented in references cited below and incorporated herein by reference. Fundamentally, these MUD analysis methods capitalize on differences in signal parameters that apply to the plurality of RFID tags, and exploit these differences so as to differentiate the RFID tag signals from each other. For example, differences in the relative distances and orientations of the RFID tags, as well as differences regarding the number and types of intervening objects, will cause signals from otherwise identical RFID tags to arrive at the RFID detector at slightly different times and with differing amplitudes and phases. There may even be more complicated time-dependent behavior that differentiates the RFID tags, for example if some of the signals are reflected from various objects. In general, the various signal parameters are used as analytical "dimensions" into which the signals from the different RFID tags are separated and thereby distinguished.

Figure 4:
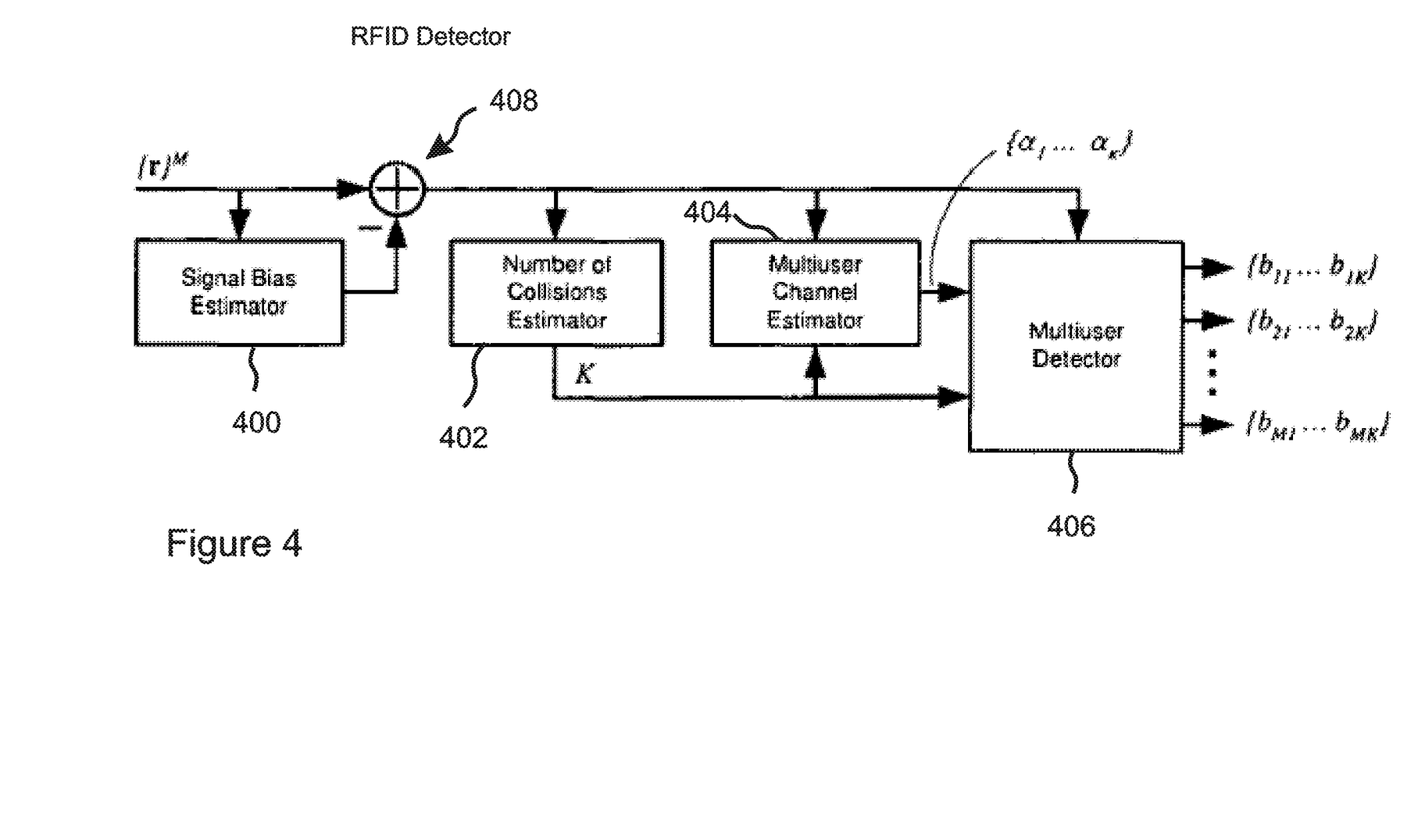
FIG. 4 is a block diagram illustrating an embodiment of the present invention in which estimated parameters used for MUD detection include signal bias, number of collisions, and channel impulse response functions.

Based on this general approach, and on the signal model defined in equation (10), it is therefore clear that in order to estimate the transmitted symbols from each colliding packet, one must first estimate the signal's parameters. FIG. 4 is a functional diagram that illustrates an embodiment in which the parameters include a received signal bias $a_o$ 400, the number of colliding packets K 402, and the channel response 404 for each tag $\{\alpha_k\}_{k=1}^{K}$ as seen at the interrogator. Once these parameters are estimated, each tag's transmitted symbols are estimated jointly across all tags using a multiuser detector algorithm 406.

Signal Bias Estimator

In the multiuser scenario modeled in equation (10), the bias term can be estimated 400 and removed 408 by subtracting the expected value from the received signal vector r. This is the same approach used in the conventional demodulation approach applied to the single tag scenario described above.

$$\tilde{r} = r - E\{r\} \qquad (13)$$
$$= SAb + \Phi a_o + w - E\{SAb\} - E\{\Phi a_o\} - E\{w\}$$
$$= SAb + \Phi a_o + w - 0 - \Phi a_o - 0$$
$$= SAb + w$$

We note that $E\{SAb\} = 0$ because, as described according to the basic signal model above, each tag's spreading sequence $\{s_k\}_{k=1}^{K}$ is assumed to be zero mean. In practice the expected value of $E\{r\}$ is estimated by averaging r over several symbol intervals.

Number of Collisions Estimator

With multiple colliding packets the usual method for identifying the number of transmitting sources, namely to count the number of unique eigenvalues of the received signal covariance matrix, will not work. Since the number of symbols being transmitted is relatively small, and since the signals themselves come from a finite alphabet, there is a non negligible probability that some of the signal eigenvalues will be indistinguishable from the noise eigenvalues. As such, this limitation also precludes the use of noise subspace identification methods like MUSIC when the channel is not assumed known and must be estimated.

From equation (10) and the assumptions on the channel, it is assumed that our received signals will arrive in somewhat well defined paired clusters. Since each of these clusters will represent a unique interference pattern for the signal, we can find the number of transmitting tags by using a Number of Collisions Estimator 402 to take $\log_2$ of the number of clusters and to count and identify the centroids of these clusters by employing statistical analysis clustering techniques. While other and various techniques are within the scope of the invention, three examples of these clustering techniques are:

K-Means algorithm
Maximum likelihood solution
T test

For each approach it is assumed that the spreading sequence on each symbol for each user is differentially encoded, for example Manchester encoded, where $\{s_k\}_{k=1}^{K} = [1, -1]^T$. This follows the ISO 18000-6 standard (see International Organization for Standardization, *Information Technology, Radio Frequency Identification for Item Management—Part 6: parameters for Air Interface Communications at 860 MHz to 960 MHz*, 1st edition, 2004, incorporated herein by reference). These solutions also hold for any other differential encoding scheme, such as FM0 coding, that is used in the EPC Global standard (see EPCglobal Inc. *Specification for RFID Air Interface, EPC Radio-Frequency Identity Protocols Class-1 Generation-2 UHF RFID Protocols for Communications at 860 MHz-960 MHz*, Version 1.0.9, 20, incorporated herein by reference).

We begin by defining $r^{(0)}$ and $r^{(1)}$ to be the elements of r, which, as described above, correspond to the chip match filter outputs. We also define $b^{(0)}$ and $b^{(1)}$ to be the equivalent input bits for $r^{(0)}$ and $r^{(1)}$ respectively ($b^{(0)}=b$ and $b^{(1)}=-b$). In the absence of destructive interference, we can assume that $r^{(i)}$ is monotonically increasing with respect to the amplitudes of A. Now, we define the following received cloud classes:

$$C_j = \{r^{(i)} | b^{(i)} \text{ contains } j \text{ 1's and } (\kappa-j)-1\text{'s}\}$$

If we sort the received clouds by their power, then, using our assumption, we find the first received cloud belongs to $C_o$ and the next $\kappa$ ordered power clouds belong to $C_j$.

K-Means Algorithm

Figure 5:
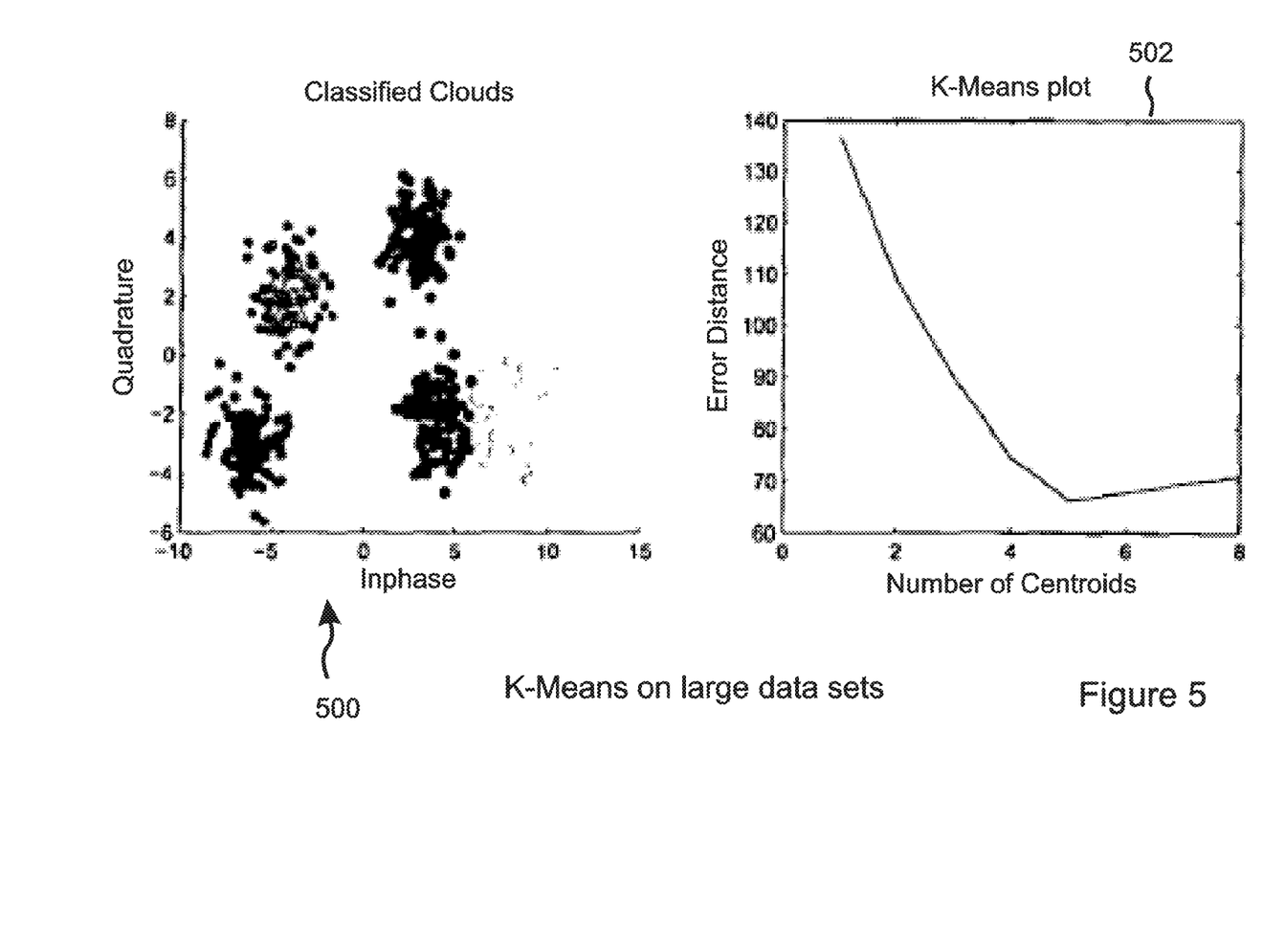
FIG. 5 is a pair of graphs that illustrate estimation of the number of collisions present in an aggregated signal by applying a statistical analysis clustering technique in an embodiment of the present invention.

Briefly stated, the K-Means algorithm tries to minimize the objective function given by $$J(\kappa) = \sum_{j=1}^{\kappa} \sum_{i=1}^{N} \|x_i^{(j)} - C_j\|^2 \quad (14)$$

where the summand is the distance between the point $x_i$ with prior classification j and the $j^{th}$ centroid. Here $\kappa$ is specified as input. The algorithm works by positing a guess for the initial values of $C_j$ and then iterating between the two steps below until convergence:

assign each point $x_i$ to the cluster with the nearest centroids; and
recompute the centroid of each cluster;

The K-Means algorithm itself is not intended to find the number of clusters in a data set. However, there are certain optimality criteria (Schwarz Criterion etc) which can identify $\kappa$ using the values for J in (14). These criteria work relatively well for large data sets, as shown in FIG. 5, which illustrates that clusters can be well resolved when displayed in complex space 500, and that the cluster resolution or "error distance" decreases as the number of centroids increases 502.

Maximum Likelihood Solution

The maximum likelihood solution takes advantage of the features specific to the RFID clustering problem. These features are:

the variance of each cluster is known and constant throughout all clusters (Noise Power);
there is a 1-1 correspondence between each cluster and its ASK equivalent inverse cluster (From Manchester encoding); and
for large data sets, each cluster will have roughly the same number of elements (Uncorrelated source signals).

For current RFID protocol standards such as EPC Global or ISO 18000-6 the length of the RFID serial number field may not be long enough to satisfy the last condition. However, for new standards this can be fixed by increasing the length of the serial number field. To make use of all the known information given above we compare the likelihood that each block and its Manchester dual came from the Gaussian distribution of its nearest neighbors against the likelihood that the new blocks and the prior clusters came from a mixture density. Mathematically, we choose the null hypothesis if $$\lambda = \frac{\prod_{m=1}^{M} \prod_{n=1}^{2} e^{-\frac{(r_m^H - \mu_0^n)^2}{2\sigma^2}}}{\prod_{m=1}^{M} \prod_{n=1}^{2} \sum_{i=1}^{2} \omega_i e^{-\frac{(r_m^n - \mu_i^n)^2}{2\sigma^2}}} > 1 \quad (15)$$

where:

n, m, I are indices of the Manchester encoding, received symbol and mixture respectively;
$r_m^n$ is the $m^{th}$ observation of r which either belongs to or is hypothesized as belonging to the cluster centered around $\mu^m$;
$\omega_i$ is the weighting factor for mixture densities (assumed to be 0.5 for two-mixtures);
$\mu_0^n$ is the recomputed sample mean of the received block of data together with its nearest cluster;
$\mu_1^n$ is the sample mean of the received data block; and
$\mu_2^n$ is the sample mean of the closest existing cluster to the received data block.

T Test

A slightly modified T test may be employed to check whether a received block belongs to a previously received cluster. Recall that the test statistic used to determine if two sample sets, A and B, arose from the same distribution is given by $$t = \frac{|\hat{\mu}_A - \hat{\mu}_B|}{\sigma_{\hat{A}B} \sqrt{\frac{1}{n_A} + \frac{1}{n_B}}} \quad (16)$$

where $\sigma\hat{A}B$ is the empirical pooled standard deviation. t is distributed according to the t distribution and the probability of type I error is given by the incomplete beta function $$P(H_1 | H_0) = \frac{1}{\beta(0.5v, 0.5)} \int_0^{\frac{v}{(v+t^2)}} t^{0.5v}(1-t)^{-0.5} dt \quad (17)$$

where $v=n_A+n_B-2$ is the degrees of freedom, $\beta$ is the $\beta$ function and $H_1$ is the hypothesis that the samples came from two distributions. Thus, if the type I error falls below a certain predefined threshold, we choose $H_1$.

A clustering algorithm, then, proceeds as follows.

Upon receiving a new symbol block, find all the existing clusters within $2\sigma$ of the sample mean of the new block.

Perform a T test against each of the existing clusters.

If $H_1$ is returned, verify by checking whether the pooled variance of the block with each existing cluster comes closer to the known noise power with the addition of the new block.

For clusters returning $H_0$, t test their Manchester inverse clusters with the next received block of symbols, which is the Manchester inverse of the prior block.

Choose to merge the blocks into the clusters that yield the smallest average type I error, where the average is taken across the Manchester clouds. If this error is above the threshold, define two new clusters with the Manchester blocks as their elements.

An alternate approach to estimating the number of collisions is to add a unique training sequence or serial number to each tag that is statically independent from each other sequence. This will increase the overhead per packet reducing overall data rate but will enable the use of subspace techniques such as the MUSIC algorithm or other techniques that count the number of unique eigenvalues of the received signal covariance matrix over measured over only the period of each packet where the training sequences or serial number fields overlap.

Multiuser Channel Estimator

Based on the received signal model defined in equation (10) the channel for each tag is modeled by the Multiuser Channel Estimator 404 as a complex gain $\alpha_k$ incorporated into the diagonal matrix A. To estimate the diagonal elements of A, we only need know which clouds belong to the classes $C_0$ and $C_1$. The process is straightforward. Let $r_j$ be a member of $C_j$. Then $$E(r_1-r_0)=SA \cdot 2e_k \qquad (18)$$

where $e_k$ is the unit vector on the $k^{th}$ basis. Thus, we can derive the K diagonal elements of the diagonal matrix A from taking the sample mean of the $\kappa$ cloud differences.

Multiuser Detector

Once the signal bias is removed and the number of colliding packets is estimated and each packets channel response is computed, a multiuser detection receiver 406 is employed to jointly demodulate the bits from each users packet.

As illustrated in FIG. 4, once all the signal parameters for each tag response are estimated, they are passed to the multiuser detector along with the unbiased received signal vector r. The maximum likelihood (ML) multiuser detector in this case can be defined as $$\hat{b}_{ML} = \arg\min_{b \in \psi^K} (r-SAb)^H (r-SAb) \qquad (19)$$

where $\psi^K$ is the K dimensional set of all possible symbol hypotheses.

Figure 6:
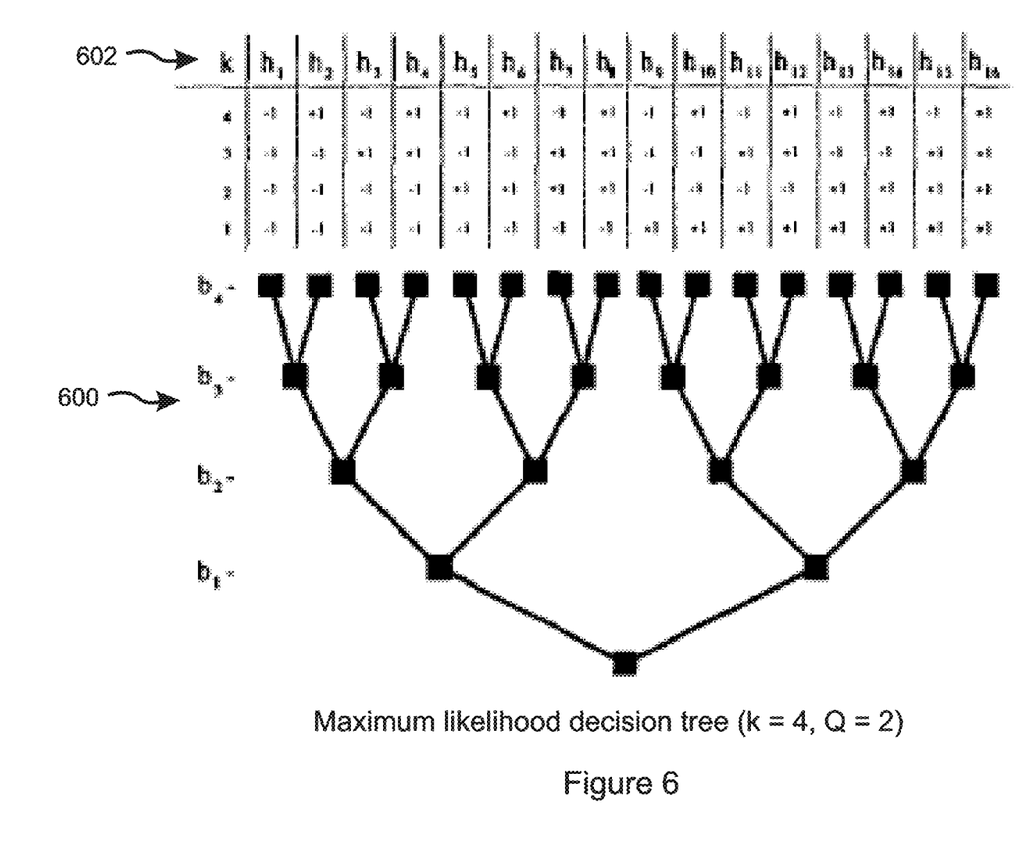
FIG. 6 is a diagram that illustrates a maximum likelihood decision tree used in an embodiment of the present invention for MUD analysis.

FIG. 6 shows an example of the ML decision tree 600 for an ASK system where K=4. In this case, obtaining the ML solution requires testing 16 hypotheses 602, a manageable complexity to implement in real time based on today's processor capabilities. However because complexity is exponential in the number of users K, this can quickly become much too computationally complex to implement in real time. Low complexity solutions are preferable. Applicant incorporates the following documents in their entirety for all purposes: patent application U.S. Ser. No. 11/035,311 and patents U.S. Pat. No. 6,999,498, U.S. Pat. No. 6,981,203, U.S. Pat. No. 6,967,598, U.S. Pat. No. 6,947,506, U.S. Pat. No. 6,839,390, U.S. Pat. No. 6,831,574, U.S. Pat. No. 6,704,376, U.S. Pat. No. 7,218,690, and U.S. Pat. No. 7,245,673.

Method for Incorporating Frequency and Spatial Diversity

It was mentioned previously that in general, the various signal parameters are used as analytical "dimensions" into which the signals from the different RFID tags are separated and thereby distinguished. In some embodiments of the present invention, additional diversity is incorporated into the received RFID tag signals 110 by transmitting the carrier wave 112 on more than one frequency and/or by using a plurality of spatially separated antennae to receive the signals 110.

Figure 7:
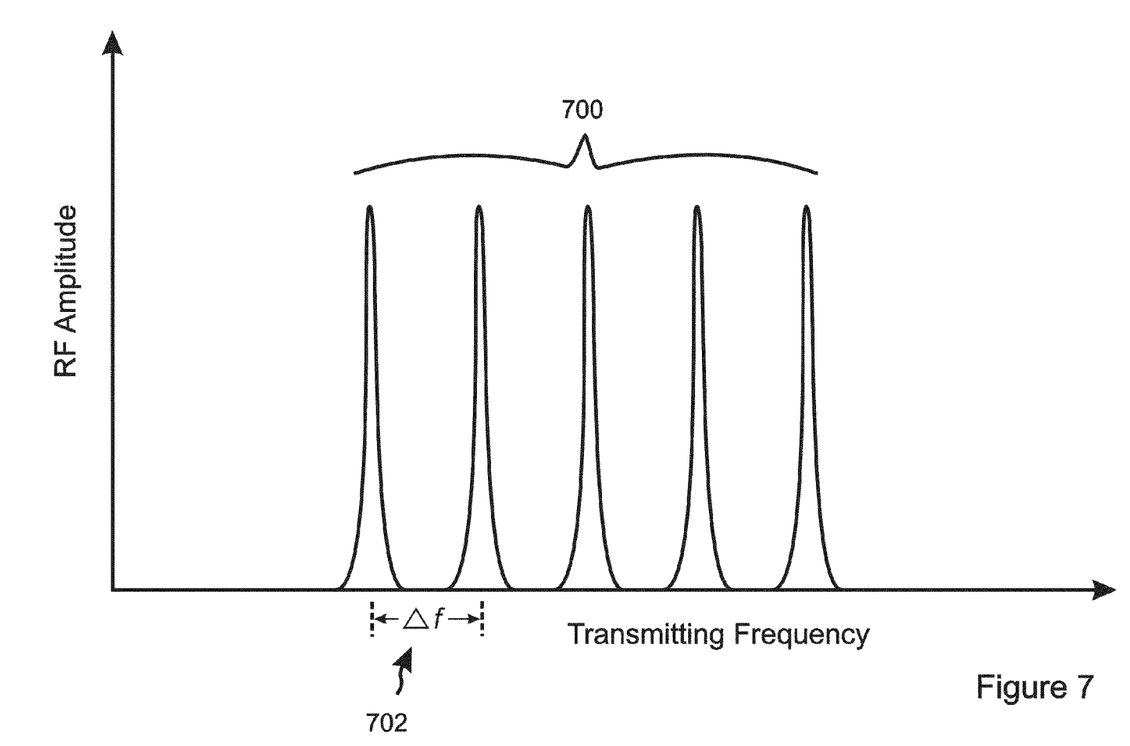
FIG. 7 is a graph illustrating application of a multi-frequency carrier wave to a group of RFID tags in an embodiment of the present invention so as to provide additional frequency dimensionality for enhanced discrimination of individual signal responses included in an aggregated RF signal.

In particular, with reference to FIG. 7, adding additional frequency diversity adds dimensionality to the problem and makes cluster identification, channel estimation and multiuser detection easier by effectively reducing the cross-correlation between colliding tag responses. Cross-correlation is reduced because for each tag there is a unique channel response, modeled as a complex gain $\alpha_k(f)$, at each frequency that is dependent on the distance $l_k$ between the tag and the interrogator, and on the mean reflection coefficient $\Phi_k(f)$ of the tag. Based on free space electromagnetic wave propagation theory described (see W. Hayt, *Engineering Electromagnetics*, McGraw-Hall, 1989, incorporated herein by reference), the mathematical model of the complex gain at each frequency f for each tag k can be explicitly defined as $$\alpha_k(f) = \phi_k(f)\exp\left\{-2l_k\zeta\sqrt{f} - j2\pi f\frac{2l_k}{c}\right\} \qquad (20)$$

where $\zeta$ is the free space attenuation constant and c is the speed of light.

Figure 8A:
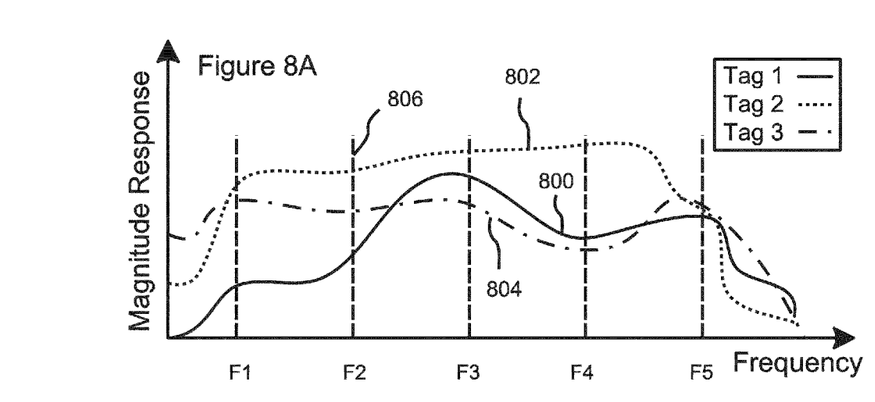
FIG. 8A is a graph that presents the magnitude as a function of frequency for a typical RFID tag complex channel response gain.
Figure 8B:
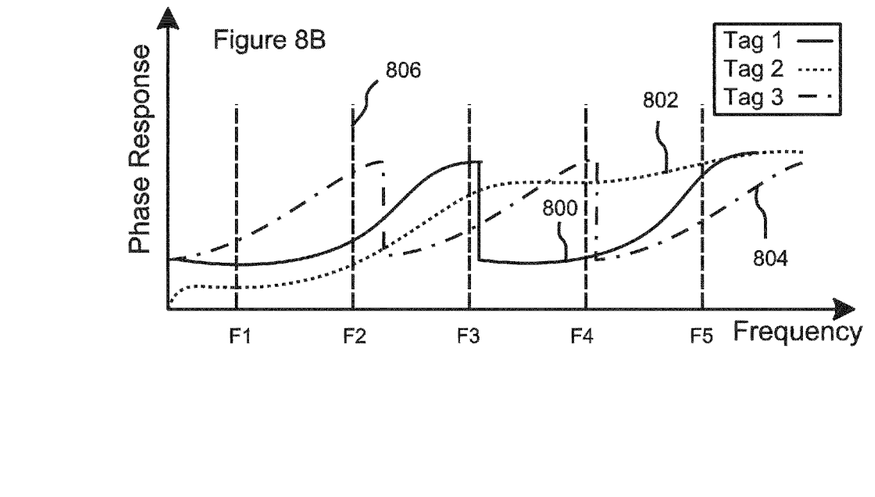
FIG. 8B is a graph that presents the phase as a function of frequency for a typical RFID tag complex channel response gain.

A typical complex gain $\alpha_k(f)$ is presented as a function of frequency for three separate RFID tags in FIGS. 8A and 8B, where FIG. 8A presents the complex amplitudes and FIG. 8B presents the corresponding complex phases. It can be seen in FIGS. 8A and 8B that the magnitudes and phases of the complex gains for the three tags 800, 802, 804, are different from each other at almost all frequencies, and that the magnitude and phase for each tag 800, 802, 804 varies significantly across the frequency range. The five transmitting frequencies of FIG. 7 are indicated as vertical, dashed lines 806 in FIGS. 8A and 8B. If the carrier wave is transmitted on all of these frequencies 806 simultaneously, the fact that each magnitude and phase response from each example tag will not be identical means that the response from the tag reflections will also not be identical for each tag across each measured frequency. This will serve to further separates clusters of responses in a higher dimensional space. With one frequency the clustering is measured in two dimensions (amplitude and phase). With multiple frequencies the clustering is measured in amplitude and phase for each frequency, resulting in 2×N dimensions where N is the number of frequencies and 2 refers to the amplitude and phase dimension measured at each frequency. In FIGS. 8A and 8B, N=5.

To impart this frequency diversity an interrogator may be used that transmits at several distinct frequencies 700 all $\Delta f$ Hz apart 702. In a realizable system the number of frequencies P and the difference between frequencies $\Delta f$ should be selected based on the assumed range distribution of the tags relative to the interrogator. P should be selected relative to the mean of the set $\{l_k\}_{k=1}^K$ because P is directly proportional to the maximum resolvable distance $l_{max}$. To provide more optimal diversity gain it is desired to increase the total frequency range $\Delta f$ as much as possible because $\Delta f$ is inversely proportional to the resolvable distance resolution $\Delta l$. To understand how this frequency diversity is incorporated into the parameter estimation and multiuser detection algorithms we rewrite equation (10) to incorporate the added frequency diversity as follows:

$$\check{r} = \check{S}\check{A}b + \check{\Phi}\check{\alpha}_o + \check{w} \qquad (21)$$

where $\check{r}$ is the NP×1 received signal vector, $\check{S}$ is the NP×KP block diagonal matrix where each block diagonal component is S, $\check{A}=[A(1)^T, \ldots, A(P)^T]^T$, $A(f)=\text{diag}\{\alpha_1(f), \ldots, \alpha_K(f)\}$, $\check{\Phi}$ is an NP×KP block diagonal matrix with block diagonal elements $\phi$, $\check{\alpha}_o$ is a KP×1 vector of complex offsets $\alpha_{o,k,f}$ and $\check{w}$ the NP×1 white Gaussian noise vector.

From this model neither the bias estimator nor the multiuser channel response estimator will change. However, there will be a unique estimate for each at each frequency. This can be obtained by passing the elements of r into each one frequency at a time. The number of collisions estimator will not change but now the clustering will be performed in a 2P dimensional space instead of the 2-dimensional complex plane. The multiuser detector algorithm will remain unchanged but its performance will greatly increase due to the reduced cross correlation between colliding packets.

It is important to note that similar gains can be obtained by incorporating spatial diversity into the RFID detector by adding multiple antenna elements to the receiver chain in different physical locations. In this case, the array spacing affects diversity. The system model for this approach also reduces to the same model defined above for adding frequency diversity. In this case the algorithms will perform just as described above.

By employing frequency or spatial diversity techniques described above the correlation between each colliding tag is reduced. This increased the performance of any algorithms used to estimate the number of collisions and the channel response. It also improves the performance of any multiuser detector.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for distinguishing responses received by an RFID detector from a plurality of simultaneously queried RFID tags, the method comprising:
   querying the plurality of RFID tags;
   receiving an aggregated RF response from the plurality of RFID tags;
   characterizing the aggregated RF response according to a plurality of characteristics, the plurality of characteristics including at least RF amplitude and RF phase;
   according to the characterization of the aggregated RF response, estimating at least one parameter, the at least one parameter including a number of RFID tag responses included in the aggregated RF response; and
   applying multiuser detection including jointly demodulating a plurality of colliding RFID tag responses included in the aggregated RF response according to the at least one estimated parameter so as to distinguish each of the RFID tag responses included in the aggregated RF response.

2. The method of claim 1, further comprising repeating the steps of querying, receiving, characterizing, estimating, and applying until the responses of all of the plurality of simultaneously queried RFID tags have been distinguished.

3. The method of claim 1, wherein the at least one parameter includes a signal bias.

4. The method of claim 3, wherein the signal bias is estimated by averaging a bias of the aggregated RF response over a plurality of symbol intervals.

5. The method of claim 3, wherein the estimated signal bias is subtracted from the aggregated RF response preceding further analysis of the aggregated RF response.

6. The method of claim 1, wherein estimating the number of RFID tag responses included in the aggregated RF response includes applying a statistical analysis method so as to detect clustering of the aggregated RF response, as characterized according to the plurality of characteristics.

7. The method of claim 6, wherein the statistical analysis method comprises one of: a K-Means algorithm; a Maximum likelihood solution; and a T test.

8. The method of claim 1, wherein: the aggregated RF response includes a plurality of unique identifying sequences transmitted simultaneously by each of the responding RFID tags, the identifying sequences being statically independent of each other, and estimating the number of RFID tag responses included in the aggregated RF response includes counting a number of unique eigenvalues in a covariance matrix derived from a portion of the aggregate RF signal that includes the simultaneously transmitted identifying sequences.

9. The method of claim 1, wherein for each of the RFID tags that contributed to the aggregated RF response, the at least one parameter includes a corresponding channel impulse response function that characterizes an alteration of an RF response from the corresponding RFID tag during transit of the RF response from the RFID tag to the RFID detector.

10. The method of claim 1, wherein: receiving the aggregated RF response from the plurality of RFID tags includes simultaneously transmitting to the plurality of RFID tags a plurality of RF carrier waves at a plurality of RF frequencies; and characterizing the aggregated RF response according to a plurality of characteristics includes characterizing the aggregated RF response according to frequency.

11. The method of claim 10, wherein the plurality of RF carrier waves is a plurality of equal amplitude RF carrier waves, and the plurality of RF frequencies is a plurality of equally spaced RF frequencies.

12. The method of claim 1, wherein: receiving the aggregated RF response from the plurality of RFID tags includes obtaining a plurality of spatially separated responses received using a plurality of spatially separated RF receiving antennae; and characterizing the aggregated RF response according to a plurality of characteristics includes characterizing the aggregated RF response according to the plurality of spatially separated responses.

13. An apparatus for distinguishing responses received from a plurality of simultaneously queried RFID tags, the apparatus comprising:

an RF transmitter configured to transmit a querying RF signal to the plurality of RFID tags;

an RF receiver configured to receive an aggregated RF response from the plurality of RFID tags;

an RF characterizer configured to characterize the aggregated RF response according to a plurality of characteristics, the plurality of characteristics including at least RF amplitude and RF phase; and a computer controlled by software configured to direct the computer to estimate at least one parameter pertaining to the characterized aggregated RF response, the at least one parameter including a number of RFID tag responses included in the aggregated RF response, the software being further configured to direct the computer to apply multiuser detection including jointly demodulating a plurality of colliding RFID tag responses included in the aggregated RF response according to the at least one estimated parameter, so as to distinguish each of the RFID tag responses included in the aggregated RF response.

14. The apparatus of claim 13, wherein the at least one parameter includes a signal bias.

15. The apparatus of claim 14, wherein the signal bias is estimated by averaging a bias of the aggregated RF response over a plurality of symbol intervals.

16. The apparatus of claim 14, wherein the estimated signal bias is subtracted from the aggregated RF response preceding further analysis of the aggregated RF response.

17. The apparatus of claim 13, wherein estimating the number of RFID tag responses included in the aggregated RF response includes applying a statistical analysis method so as to detect clustering of the aggregated RF, as characterized according to the plurality of characteristics.

18. The apparatus of claim 17, wherein the statistical analysis method comprises one of: a K-Means algorithm; a Maximum likelihood solution; and a T test.

19. The apparatus of claim 13, wherein: the aggregated RF response includes a plurality of unique identifying sequences transmitted simultaneously by each of the responding RFID tags, the identifying sequences being statically independent of each other; and estimating the number of RFID tag responses included in the aggregated RF response includes counting a number of unique eigenvalues in a covariance matrix derived from a portion of the aggregate RF signal that includes the simultaneously transmitted identifying sequences.

20. The apparatus of claim 13, wherein for each of the RFID tags that contributed to the aggregated RF response, the at least one parameter includes a corresponding channel impulse response function that characterizes an alteration of an RF response from the corresponding RFID tag during transit of the RF response from the RFID tag to the RFID detector.

21. The apparatus of claim 13, wherein: the RF transmitter is able to simultaneously transmit to the plurality of RFID tags a plurality of RF carrier waves at a plurality of RF frequencies; and the software is able to direct the computer to characterize the aggregated RF response according to the plurality of RF frequencies.

22. The apparatus of claim 13, further comprising a plurality of spatially separated RF receiving antennae that are able to receive the aggregated RF response as a plurality of spatially separated responses, the software being able to direct the computer to characterize the aggregated RF response according to the plurality of spatially separated responses.

* * * * *